Nov. 2, 1954  A. APPLETON  2,693,154
DELIVERING OF PLASTIC MATERIAL
Filed May 10, 1948  2 Sheets-Sheet 1
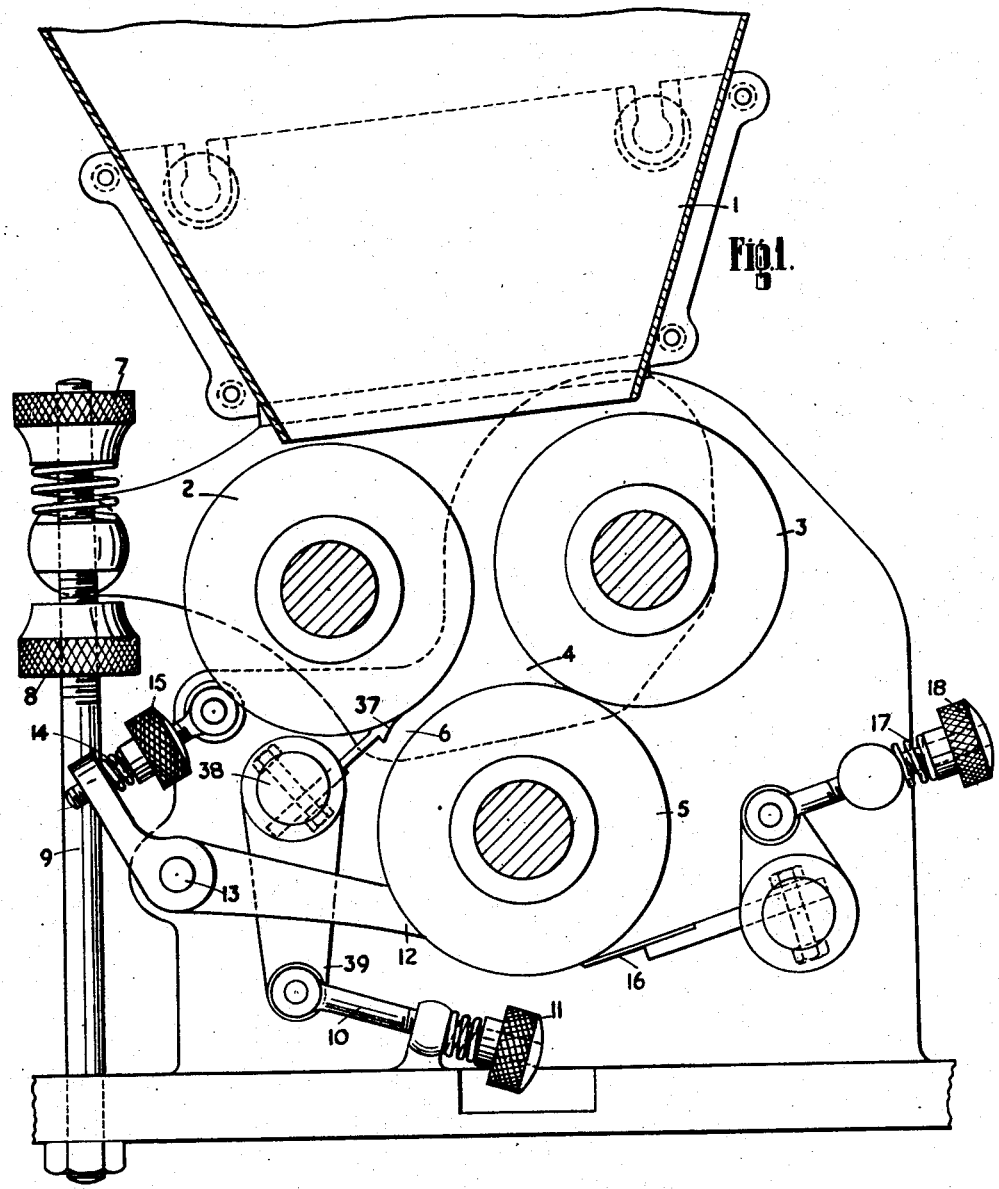

Nov. 2, 1954 — A. APPLETON — 2,693,154
DELIVERING OF PLASTIC MATERIAL
Filed May 10, 1948 — 2 Sheets-Sheet 2
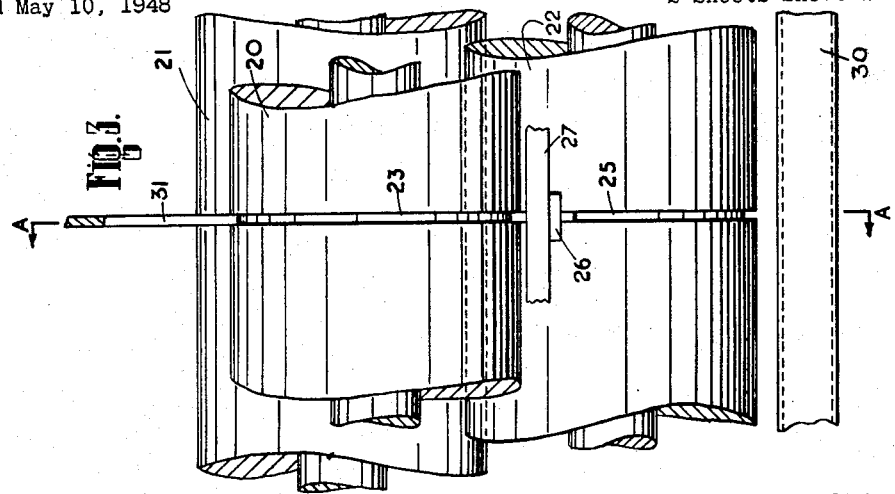
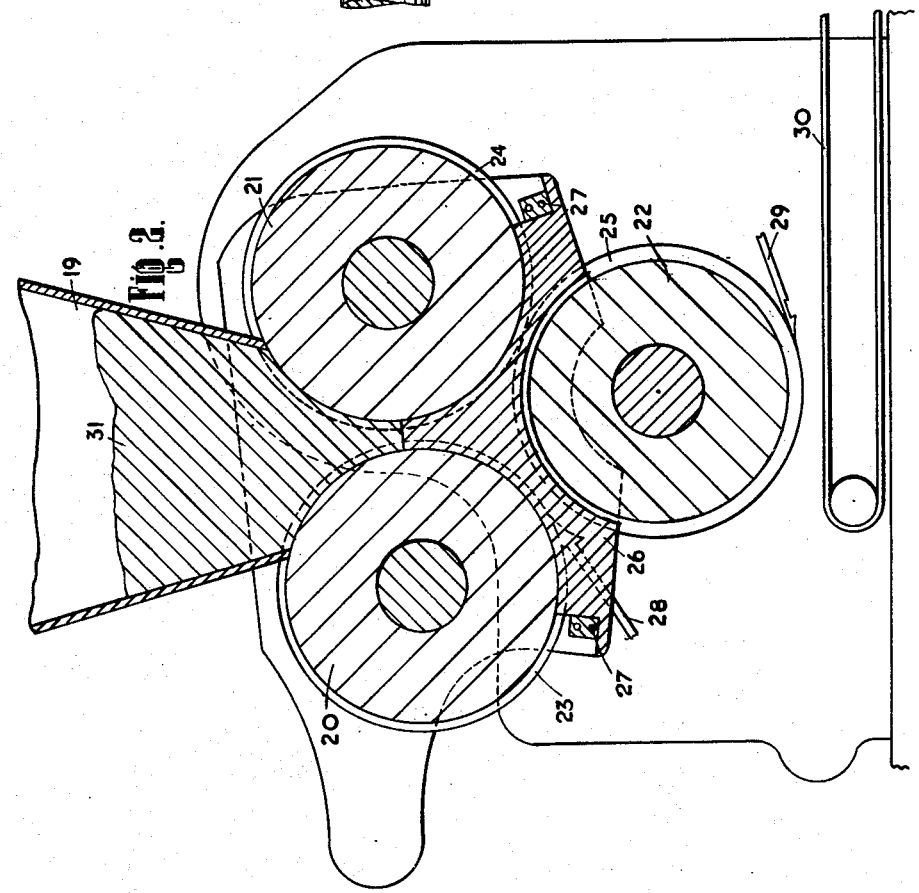
Albert Appleton
INVENTOR
BY
S. Victor Armstrong ATTORNEY United States Patent Office 2,693,154
Patented Nov. 2, 1954

2,693,154

DELIVERING OF PLASTIC MATERIAL

Albert Appleton, Newton-le-Willows, England, assignor to T. & T. Vicars Limited, Newton-le-Willows, England, a British company Application May 10, 1948, Serial No. 26,158

Claims priority, application Great Britain June 3, 1947

4 Claims. (Cl. 107—12)

The present invention relates to an improved apparatus for the delivering of plastic material.

Plastic material formed from a dough-like mass is often required in the form of strips, as for instance in the manufacture of biscuits or confectionery from dough, cake mixture or the like confectionery material.

It has been usual to form a continuous sheet or web of dough or batter either by extrusion or by feeding from the delivery bight of two or more rollers, and then to bake this web or continuous sheet upon a traveling or fixed band whereupon the sheet is divided into strips or ribbons, as in the manufacture of the confectionery known as Swiss rolls, in which case it is essential that the strips be exactly to the desired weight. This may not be achieved if the division is made after baking, should the conveyor belt wander out of alignment relative to the cutter dividing the sheet longitudinally.

The purpose of this invention is to ensure uniform division of the deposit because at present it is usual to divide the deposit after it has left the oven, and owing to the fact that the conveyor band is liable to wander, the cutting device may not evenly divide the deposit. It also avoids scrap in cutting.

According to the present invention the dough or cake mixture is divided into a number of parallel strips or ribbons prior to or simultaneously with their deposition upon a traveling band conveyor, and prior to baking or cooking as shown in Figs. 1–3 inclusive.

The invention is further described with reference to the accompanying drawings, in which:

Fig. 1 is a diagrammatic side sectional elevation of one suitable form of construction for carrying out the invention;

Fig. 2 is a corresponding view of a modified form of roller construction, the section being taken on the line A—A of Fig. 3; and Fig. 3 is a partial end view corresponding to Fig. 2.

Lumps of baker's dough, cake mixture or like confectionery material are fed to a hopper 1 and fall into the bight between a pair of rotating rollers 2, 3, and thence into a compression space 4 formed between this pair of rollers 2, 3, and a third rotating roller 5 mounted below them and on a parallel axis.

Dough leaves the compression space 4 through the gap 6 between the roller 2 and 5, which gap may be adjustable by means of the nuts 7, 8 on the threaded spindle 9.

As the dough emerges from the outlet 6 from the compression space 4, it is stripped by a concave faced scraper 37 mounted on a shaft 38 having a crank arm 39 pivotally connected to a link 10 adjustable by a nut 11 so that the pressure of the blade 37 on the roller 2 can be adjusted as desired.

The dough sheet then stripped from the roller 2 but still adhering to the roller 5, is severed into a plurality of parallel bands or ribbons by a series of thin blades 12 in spaced relationship along the axis of the roller 5 and contacting with its periphery, these blades 12 being mounted to pivot about a shaft 13 and being held elastically in engagement with the surface of the roller 5 by spring and nut means 14, 15.

The series of parallel bands or ribbons is then stripped from the surface of the roller 5 by a blade 16, which may be common to all the bands or ribbons, and which is also provided with a spring and nut adjustment means 17, 18.

The bands or ribbons leaving the surface of the roller 5 may then fall by gravity upon an endless belt conveyor transferring them to a desired point.

In the modified form of construction shown in Figs. 2 and 3, the material such as dough or cake mixture is fed to a hopper 19 and from there passes to the bight of a pair of rotating rollers 20, 21, forming a compression space with a third roller 22 in contact with the roller 21, all three rollers 20, 21 and 22 being provided at spaced intervals along their length with grooves 23, 24, 25, respectively, in which fit division plates 26 connected by spaced tie rods 27 and division plates 31, fitting into grooves 23 and 24 to divide the hopper. These division plates are rigidly held in position by locking bars (not shown) arranged at the top of the hopper 19.

A plurality of stripping blades 28 (removed from Fig. 3 for the sake of clearness) engage the surface of roller 20 between each division plate 26 to strip the dough emerging from the gap between the rollers 20 and 22 in the form of a sheet from the said roller 20, the dough sheet adhering to the roller 22 then being stripped therefrom by a blade or knife 29 to fall upon a continuous conveyor 30. Fig. 2 shows the device as it would appear with an intermediate gap adjustment between rollers 20 and 22, said gap spacing adjustment being limited by the predetermined dimensions of the division plates 26 and the depths of the grooves. The apparatus embodying the division plates is particularly useful in cases where it is desired to run off strips of dough of differing colour or other characteristic simultaneously.

If the plates 31 are omitted, dough fed to the hopper 19 will pass to the compression space between the rollers 20, 21, 22, and emerge therefrom as a plurality of separate parallel strips or ribbons, but such arrangement is obviously not applicable where the strips or ribbons are required to be of differing characteristic such as colour.

I claim:

1. An apparatus for producing continuous parallel strips or ribbons of dough or batter material comprising in combination a frame, a plurality of rollers journalled on parallel axes within said frame with their peripheral surfaces spaced apart to define inlet and outlet gaps for the material, the said peripheral surfaces defining circumferential grooves of uniform section spaced axially of and in transverse alignment between said rollers, division plates mounted in said frame to extend in planes transversely of the roller axes into said outlet gap with the edges thereof projecting into said grooves, the thickness of said plates being substantially equal to the axial width of said grooves, means to feed said material to said inlet gap and stripper means to disengage the strip material from the rollers defining said outlet gap.

2. An apparatus for producing continuous parallel strips or ribbons of dough or batter material comprising in combination a frame, a plurality of rollers journalled on parallel axes within said frame with their peripheral surfaces spaced apart to define inlet and outlet gaps for the material, the said peripheral surfaces defining circumferential grooves of uniform section spaced axially of and in transverse alignment between said rollers, division plates mounted in said frame to extend in planes transversely of the roller axes into said outlet gap with the edges thereof projecting into said grooves, the thickness of said plates being substantially equal to the axial width of said grooves, means to feed said material to said inlet gap, stripper means to disengage the strip material from the rollers defining said outlet gap and means for adjusting the spacing between the rollers defining said outlet gap whereby to enable variation of the thickness of strip delivered through said outlet gap.

3. An apparatus for producing continuous parallel strips or ribbons of dough or batter material comprising in combination a frame, a plurality of rollers journalled on parallel axes within said frame with their peripheral surfaces spaced apart to define inlet and outlet gaps for the material, the said peripheral surfaces defining circumferential grooves of uniform section spaced axially of and in transverse alignment between said rollers, division plates mounted in said frame to extend in planes transversely of the roller axes into said outlet gap with the edges thereof projecting into said grooves, the thickness of said plates being substantially equal to the axial width of said grooves, a hopper disposed on said frame to feed material to said inlet gap, further division plates extending into said inlet gap and the interior of said hopper in respective edge abutting relationship with the first mentioned division plates and projecting into some of said grooves, and stripper means to disengage the strip material from the rollers defining said outlet gap within limits determined by the depth of said grooves.

4. An apparatus for producing continuous parallel strips or ribbons of dough or batter material comprising in combination a frame, a pair of rollers mounted parallel and rotatably within said frame in substantial peripheral surface contact, a movable portion of said frame pivotal about the axis of a first roller of said pair, a third roller rotatably mounted in said movable portion parallel to said pair to define with said first roller an inlet gap and with the second roller of said pair an outlet gap, the peripheral surfaces of the three rollers defining circumferential grooves of uniform section spaced axially of and in transverse alignment between said rollers, division plates mounted in said frame to extend in planes transversely of the roller axes into said outlet gap with the edges thereof projecting into said grooves, the thickness of said plates being substantially equal to the axial width of said grooves, means to feed material to said inlet gap, means to oscillate said movable portion adjustably about the axis of said first roller whereby to vary the thickness of strip material delivered, and stripper means to disengage the strip material from said second and third rollers.

References Cited in the file of this patent

UNITED STATES PATENTS

| Number | Name | Date |
|---|---|---|
| 775,152 | Stenzy | Nov. 15, 1904 |
| 1,332,435 | De Vito | Mar. 2, 1920 |
| 1,994,854 | Dieterle | Mar. 19, 1935 |
| 2,276,545 | Olgiati | Mar. 17, 1942 |

FOREIGN PATENTS

| Number | Country | Date |
|---|---|---|
| 417,852 | Great Britain | Oct. 15, 1934 |
| 565,790 | Great Britain | Nov. 28, 1944 |